United States Patent Office 3,447,982
Patented June 3, 1969

3,447,982
AMMONIUM NITRATE HAVING DIATOMACEOUS EARTH DISPERSED THEREIN AND METHOD OF MAKING SAME
Joseph J. Minnick, Marion, Ill., assignor to Commercial Solvents Corporation, New York, N.Y., a corporation of Maryland
No Drawing. Filed Apr. 14, 1967, Ser. No. 630,807
Int. Cl. C06b 1/04
U.S. Cl. 149—46                                                    5 Claims

ABSTRACT OF THE DISCLOSURE

A porous ammonium nitrate composition suitable for explosive use comprising ammonium nitrate having dispersed therein from 0.5% to about 4% by weight diatomaceous earth and from 0.0% to 1.0% by weight urea produced by dispersing the diatomaceous earth and urea, if any, in molten ammonium nitrate, followed by cooling of the mixture.

SUMMARY OF THE INVENTION

This invention relates to an ammonium nitrate composition and process therefor. In a particular aspect, it relates to a porous composition of ammonium nitrate suitable for explosive uses.

L. A. Stengel, U.S. Patents 2,568,901 and 2,773,753 described a process for the production of ammonium nitrate whereby ammonia vapors and nitric acid are reacted in approximately equi-molecular quantities at elevated temperatures to produce anhydrous molten ammonium nitrate. The molten ammonium nitrate is passed through a steam separator, then onto a flat moving belt, where it is cooled to form a flat sheet of solid ammonium nitrate which is then broken into granules of from 1/16 in. to 3/16 in. and of comparable thickness. It is also known to cool the molten ammonium nitrate by spraying it into a prilling tower whereby the ammonium nitrate is recovered as spherical globules or prills. The granules and prills obtained by this process have a high density, significantly higher than the prills obtained by the conventional process of spraying a concentrate of solution into a prilling tower.

The ammonium nitrate granules and prills produced by the Stengel process are satisfactory for fertilizer use, but they are unsatisfactory in explosive ammonium nitate-hydrocarbon mixtures which constitute one of the very large uses for conventional ammonium nitrate prills. These explosive combinations are readily prepared by mixing the ammonium nitrate with about 5–10% of its weight of an oxidizable substance, usually a hydrocarbon such as fuel oil, kerosene, and the like. The resulting mixture is relatively stable toward shock in ordinary handling, yet can be readily detonated by use of a blasting cap and conventional primer.

Because Stengel process ammonium nitrate has a high density, it does not absorb the hydrocarbon sensitizer to a satisfactory extent. Conventional prills are sufficiently porous to readily absorb 5% or more of hydrocarbon, which is enough to form a primer-sensitive mixture (i.e. it can be detonated by a blasting cap and conventional primer). Because the high density material lacks absorptive capacity for the hydrocarbon sensitizer, it tends to drain off after mixing instead of being absorbed. Consequently, the high density ammonium nitrate can be detonated only by the use of heavy boosters, but even with boosters, failures frequently occur, especially in smaller diameters, so that the high density material has been generally unsatisfactory as an explosive. Thus, a stability feature, which was highly desirable to the fertilizer industry, has proven undesirable to the explosives industry.

Uncoated ammonium nitrate is highly hygroscopic and absorbs moisture to form a hard cake. Diatomaceous earth is commonly used as a coating agent to reduce the moisture absorption and caking. It is applied to the surface of the cooled granules and prills, both the conventional and dense, by tumbling and dusting methods. The diatomaceous earth coating may constitute as much as 3–5% by weight of the total mixture, but it is present only on the surface of the particles and is never present dispersed within the particle.

Urea is a commonly used fertilizer material, but when used with ammonium nitrate in mixed fertilizers, it is present as a physical commingling of solid, discrete particles. Killman, Khim. Prom. 1962, 66–9 (Chem. Abs. 57, 5552h) studied the stabilizing effect of small amounts of urea on molten ammonium nitrate at 165–240° C. He reported that 0.3% by weight of urea neutralized free nitric acid and reduced losses of nitrogen. He also reported that the caking tendency of the ammonium nitrate-urea mixture was lower than the urea-free product, but that the hygroscopic behavior was unchanged.

It is an object of this invention to provide an ammonium nitrate composition and a process therefor.

It is another object of this invention to provide a porous composition of ammonium nitrate suitable for explosive uses.

A process has been discovered for the production of a porous, solid ammonium nitrate composition by dispersing into molten ammonium nitrate one or more porosity-providing additives and cooling the resulting composition as is known in the art. The porous solid ammonium nitrate thereby obtained is particularly suitable for explosive use with hydrocarbons, e.g. fuel oil. The porous ammonium nitrate is wetted well by the hydrocarbon and readily absorbs 5% or more of it with no problem of runoff or puddling to form a primer-sensitive mixture comparable to conventional sensitized prills.

The porosity-providing additive can be diatomaceous earth, or it can be diatomaceous earth plus urea, or urea alone. However, urea-ammonium nitrate combinations have been found to be very frangible and hence have poor shipping and handling qualities. The compositions of this invention contain from about 0.5% to about 4% of diatomaceous earth, preferably from about 1.5% to about 3% by weight based on the ammonium nitrate, and from 0.0% to about 1% or more of urea, preferably from 0.10 to about 0.3% by weight based on the ammonium nitrate. Concentrations of urea above about 1% by weight are preferably avoided, because the composition grows more sensitive to shock with increasing urea content.

According to the Stengel process, the molten ammonium nitrate is drawn from the reactor and is then passed through a steam separator and thence to a cool stainless steel belt where it cools and forms a solid sheet. In a large plant, two or more belts are generally in use, and in that case a weir box is employed ahead of the belts to allow an even flow of the molten ammonium nitrate onto the belts. In the preferred embodiment of the process of this invention, the porosity-providing additive is dispersed in the ammonium nitrate in the weir box by mixing, using any suitable means, several of which are known. It is also convenient to receive the molten ammonium nitrate in a vessel ahead of the weir box, if any, and to disperse the porosity-providing additive or additives in the ammonium nitrate while in such a vessel. The mixture is then delivered to the weir box.

The terms "dispersing" and "dispersed" are intended to mean that the additive forms a system of minute particles distinct and separate from one another and suspended in a liquid or solid medium, more or less uniformly. The particles may be of molecular size, in which case a solution is obtained, or they may be of colloidal or larger size.

Although little difficulty is experienced with settling out of the additive, agitation can be provided in the weir box, if necessary, by any suitable means, several of which are known. When the molten ammonium nitrate has been delivered to the cooling zone, further agitation is unnecessary. When the cooled ammonium nitrate is obtained in the form of a sheet, as when cooled on a belt, the sheet is broken up and screened as is known to those skilled in the art.

DETAILED DESCRIPTION

The diatomaceous earth suitable for use in the practice of this invention can be any of the powdered, commercially-available grades. Preferably, the coating grade commonly used for coating fertilizer grade ammonium nitrate is used. Grades of diatomaceous earth, which range from crude to highly refined material, show varying degrees of effectiveness depending on the temperatures employed in their processing. Generally, the preferred grades are of comparatively lower density, i.e. those which have not been excessively heated. A particularly preferred grade is sold under the trademark Celite 289, by Johns-Manville Corporation, 22 E. 40th St., New York, N.Y.

The urea suitable for the practice of this invention can be any commercially available grade. Fertilizer grade is preferred for the sake of economy, and the urea should be comminuted prior to addition to the molten ammonium nitrate.

The urea and the diatomaceous earth can be added separately or, preferably, they can be premixed in a suitable proportion and added together.

The ammonium nitrate suitable for the process of this invention can be any commercial grade ammonium nitrate, either uncoated or containing up to 4% diatomaceous earth as a coating agent, but preferably it is free from carbonaceous materials to avoid a hazardous mixture in the molten state. Preferably, the ammonium nitrate is freshly-produced molten material delivered from the reactor of the Stengel process.

Since an object of this invention is to provide porous ammonium nitrate suitable for explosive use, the criterion was established that a satisfactory material when mixed with 5% by weight of No. 2 fuel oil will exhibit an average card gap of not less than 200 mils in a modified card gap apparatus. Commercial prills presently used successfully show a card gap of 300–400 mils when mixed with 5% fuel oil in this apparatus.

The card gap test was originally devised by the Committee on Rocket Propellent Test Methods of the American Rocket Society for the purpose of measuring the sensitivity to shock of substances which are insensitive to No. 8 blasting caps. The apparatus is designed so that a stack of plastic, usually cellulose acetate, spacer cards, each of 10 mil thickness, can be inserted between the test sample and a powerful initiator. The number of cards is varied until a thickness, or gap, is reached where the sample will detonate on 50% of the trials. The broader the gap, the more sensitive the test sample is to shock. Different pieces of apparatus give different results, so the test equipment must be calibrated with materials of good reproducibility to provide significant data.

In the modified test employed in the development of the present invention, the test sample is contained in an aluminum tube, 1 in. internal diameter and 6 in. in length. The sample is separated from the spacer cards by a 2 ml. thickness of polyethylene film. In the test a ¼ in. thick aluminum plate is placed over the opposite end of the tube (open). The number of spacer cards is varied until the test sample breaks the aluminum plate on 50% of the trials. The initiator used is a 37 g. cylindrical pentolite (pentaerythritol tetranitrate) pellet and a No. 8 electric blasting cap.

The apparatus was calibrated against two brands of commercially-available, porous, prilled ammonium nitrate known to be well-accepted by explosive users; against an ammonium nitrate-fuel oil mixture sensitive to a No. 6 cap; and against an ammonium nitrate-fuel oil mixture sensitive to a No. 8 cap. The commercial prills mixed with 5% No. 2 fuel oil detonated at 30 to 40 cards (300–400 mil) and failed at 35–45 cards. The mixture sensitive to a No. 6 cap had a card gap of about 112 cards (1120 mils), and the mixture sensitive to a No. 8 cap had a card gap of 92 (920 mils).

The following examples further illustrate the practice of this invention, but it is not intended that the invention be limited thereby.

Example 1

A sample of uncoated commercial grade ammonium nitrate was melted by heating to above its melting point of 170° C. Then 3% by weight of coating grade diatomaceous earth and 0.4% of urea were added. The mixture was agitated thoroughly and poured onto a cold surface to give a cake having a thickness between ⅛ and ¼ inch. After cooling, the cake was broken up into granules; fines which would pass a 20 mesh screen were removed. This material was mixed with 5% by weight No. 2 fuel oil without runoff and the resulting mixture had a card gap of 750 mils; it was determined to be satisfactory for blasting purposes.

Example 2

The experiment of Example 1 was repeated except that the urea was omitted. There was no runoff when the product was mixed with 5% by weight of No. 2 fuel oil. The mixture had a sensitivity of 750 mils and was determined to be satisfactory for blasting purposes.

Example 3

The experiment of Example 1 was repeated except that 1% by weight Celite 289 and 0.4% by weight urea were added. The product absorbed 5% by weight of fuel oil without runoff and the resulting mixture had a card gap of 1000 mils, therefore satisfactory for blasting purposes.

Example 4

A sample of commercial grade, granular ammonium nitrate fertilizer having a coating of 3.5% diatomaceous earth was melted, mixed thoroughly, then cooled and crushed in accordance with Example 1. The product absorbed 5% by weight fuel oil without runoff and the resulting mixture had a card gap of 750 mils, satisfactory for blasting purposes.

Examples 5–6

The experiment of Example 1 was repeated except that 1% by weight diatomaceous earth and 0.1% by weight urea were added to the melt. The resulting product retained 5% by weight of fuel oil without runoff, but it appeared wet. It had a sensitivity of 400 mils. The experiment was repeated with 2% diatomaceous earth and 0.1% urea. The product appeared dry with 5% by weight fuel oil and had a card gap of 650 mils.

Examples 7-13

The experiment of Example 1 was repeated in general, employing varying concentrations of porosity-providing additives. The products were broken into granules and mixed with 5% of No. 2 fuel oil. The card gap of the mixture was then determined. In Examples 11 and 13, the product was coated before mixing with the fuel oil to resist moisture absorption. The coating did not cause a serious loss of sensitivity.

| Example No. | Urea, percent by wt. | Diatomaceous earth, percent by wt. | Celite 289, percent by wt. | Card gap, mils |
|---|---|---|---|---|
| 7 | | 1.0 | | 700 |
| 8 | | | 1.0 | 550-600 |
| 9 | 1.0 | | 1.0 | 800 |
| 10 | 1.0 | 2.0 | 1.0 | 500-600 |
| 11 | | 1.0 | | [1] 450-500 |
| 12 | 0.4 | 2.0 | 1.0 | 450-500 |
| 13 | 0.1 | | 2.0 | [2] 400 |

[1] Product coated with additional 3% by wt. of diatomaceous earth.
[2] Product coated with 1% by wt. of AC-1 clay, marketed by United Clay Mines Corporation, Trenton, N.J.

Example 14

The experiment of Example 6 is repeated except that the ammonium nitrate is freshly-produced molten ammonium nitrate manufactured according to the Stengel process. The porous ammonium nitrate so prepared is satisfactory for explosive use.

I claim:

1. In combination, a composition comprising solidified, porous ammonium nitrate having dispersed therein from about 0.5% to about 4.0% by weight of diatomaceous earth and from about 0.0% to about 1% by weight of urea.

2. The composition of claim 1 wherein the diatomaceous earth is present in a concentration of from about 1.0% to about 3.5% by weight, and the urea is present in a concentration of from about 0.1% to about 0.4% by weight.

3. The composition of claim 1 wherein the diatomaceous earth is present in a concentration of from about 1.0% by weight to about 3.5% by weight.

4. A process for the production of a porous ammonium nitrate composition comprising dispersing into molten ammonium nitrate from about 0.5% to about 4.0% by weight of diatomaceous earth, and from 0% to about 1.0% by weight of urea, and cooling said composition to effect solidification thereof.

5. An explosive composition comprising porous ammonium nitrate and a hydrocarbon oil, wherein said ammonium nitrate has dispersed therein from about 0.5% to about 4.0% by weight of diatomaceous earth and from about 0.0% to about 1% by weight of urea.

References Cited

UNITED STATES PATENTS

| 2,814,555 | 11/1957 | Rinkenbach et al. | 149—46 |
| 2,975,046 | 3/1961 | Cooley et al. | 149—46 X |
| 2,976,137 | 3/1961 | Stengel | 149—46 X |
| 2,992,912 | 7/1961 | Hradel et al. | 149—46 |
| 2,997,378 | 8/1961 | Cox et al. | 149—46 X |
| 3,046,888 | 7/1962 | Gordon | 149—46 X |
| 3,150,019 | 9/1964 | Logan et al. | 149—46 X |
| 3,180,768 | 4/1965 | Scott | 149—46 X |
| 3,240,641 | 3/1966 | Wilson | 149—46 |
| 3,291,659 | 12/1966 | Yancik | 149—46 X |
| 3,305,414 | 2/1967 | Hodgson | 149—46 |

BENJAMIN R. PADGETT, *Primary Examiner.*

S. J. LECHERT, *Assistant Examiner.*

U.S. Cl. X.R.

149—46